March 3, 1970  P. JORGENSEN  3,497,957
METHOD AND APPARATUS FOR MEASURING AND MARKING LENGTHS
OF MOVING MATERIAL
Filed Aug. 7, 1967  4 Sheets-Sheet 1

INVENTOR.
PIERRE JORGENSEN
BY
*Bauer and Seymour*
ATTORNEYS

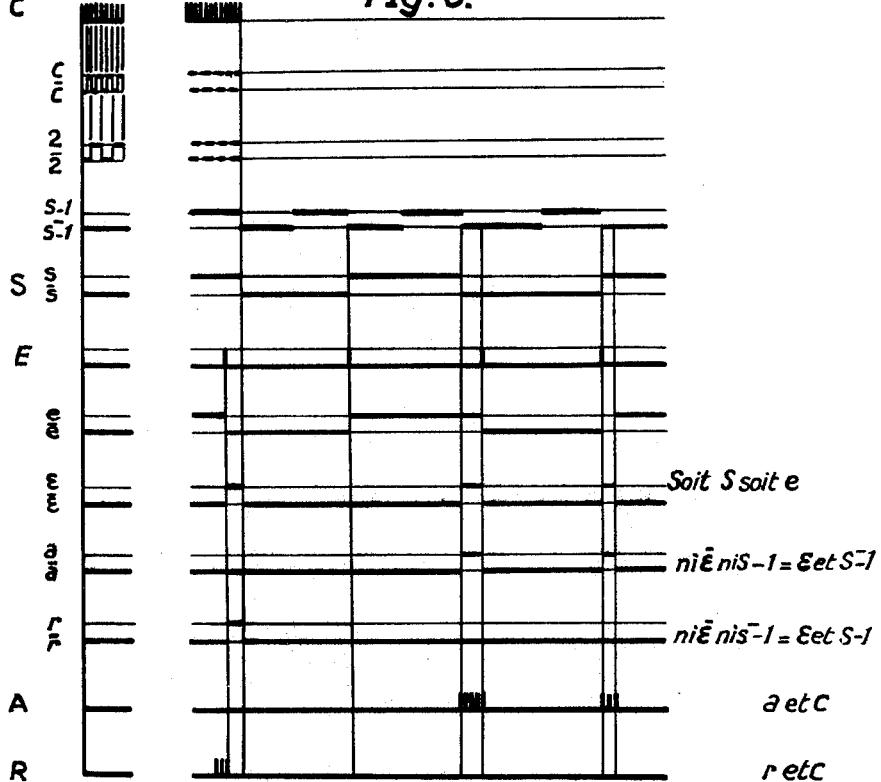
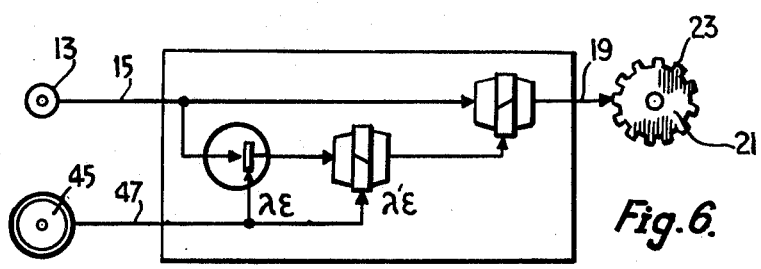
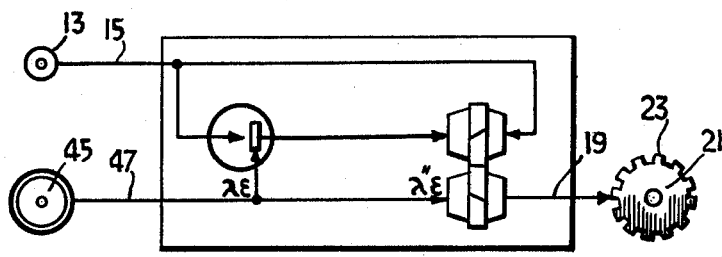

United States Patent Office 3,497,957
Patented Mar. 3, 1970

3,497,957
METHOD AND APPARATUS FOR MEASURING AND MARKING LENGTHS OF MOVING MATERIAL
Pierre Jorgensen, 1 Rue Isabeau, L'Hay-les-Roses, France
Continuation-in-part of application Ser. No. 343,742, Feb. 10, 1964. This application Aug. 7, 1967, Ser. No. 658,925
Claims priority, application France, Feb. 11, 1963, 924,360, Patent 1,357,676
Int. Cl. G01b 5/04
U.S. Cl. 33—129     27 Claims

ABSTRACT OF THE DISCLOSURE

A double measurement is applied to a length of moving material, for instance to a length of glass sheet in preparation for cutting it, the first measurement being continuous and totalized, the second being intermittent and exact, the two being combined to provide corrections which eliminate error and the accumulation of error.

---

This application is a continuation in part of application Ser. No. 343,742 filed Feb. 10, 1964, (now abandoned) claiming the priority of an application Ser. No. 924,360 filed in France on Feb. 11, 1963, and of related applications in other countries.

This invention is applicable to the mensuration of moving lengths of material. It is particularly valuable in the cutting of glass sheet from the moving ribbon of its formation to exact sizes which conform to commercial requirements and eliminates defects, and it will be described in particular relation to that use.

In the continuous method of manufacturing sheet glass, it is necessary for efficient low-cost production, that measurement indications be continuously available, of the distance traveled by a point on the moving ribbon of glass, from a fixed or datum point. The glass as it comes from the final processing annealing or polishing, is in the form of a flat, continuously advancing ribbon which must be inspected for defective spots or areas before being severed into usable lengths. These areas must be marked or visibly identified so that the ribbon may be subsequently severed into sections of dimensions which will not only conform to standard sizes or to existing orders, but which will also eliminate the defective spots or areas, with a minimum loss of saleable glass. Other procedures necessarily performed upon the glass, such as the affixing thereto of labels of size, thickness, grade, trademarks, etc., require continuously accurate measurements of length upon the moving ribbon. These and other reasons make it imperative to know to a high degree of accuracy, the instantaneous distance that any selected first point on the glass, has traveled or advanced with respect to a second and fixed point, in order that automatically operating marking, severing, labeling, and quality control means may perform their respective functions on the ribbon at the desired points thereon. The aforesaid first point may, for example, be a point in the leading edge of the ribbon or strip, while the second point may be one fixed with respect to the apparatus, and in a plane normal to the direction of travel of the strip.

Notwithstanding the need for continuous and accurate measurements of instantaneous distances traveled by the strip, measuring means driven by a rolling contact friction wheel, is essentially the only practicable way to set off the required random lengths or desired distances on the glass. On the other hand, the use of such a wheel unavoidably introduces cumulative errors due to wear of the wheel tread, variations in the force with which it contacts the glass, variations in rate of travel of the strip, irregularities in its surface, and even changes in temperature.

The invention substantially consists in intermittently tracing on the traveling strip, by means of a calibrating device considered as an absolute value, the markings defining strip section lengths (for instance, the space between two markings or two cutting lines), to compare these calibrated lengths with those indicated by a continuous registering device, of the strip position, subject to cumulative errors, and to use the error noted in order to control the continuous registering device so as to correct the accumulated errors and to prevent, by another adjustment of the continuous registering device, future errors.

The invention also relates to a device for making it possible automatically and periodically to make this comparison and adjustment and to use the exact strip position thus achieved in order to control the operation of the marking, cutting and other machines.

It is therefore an object of this invention to provide a method and apparatus for accurately and continuously measuring the length of a glass sheet which has passed a fixed point.

Another object is to provide an improved measuring apparatus which automatically detect and corrects measuring errors.

Another object is to provide an apparatus for continuously measuring predetermined increments on a continuously moving glass sheet, recording the total increments measured, and utilizing the total for correcting any accumulated errors.

Another object is to provide an apparatus for continuously measuring predetermined increments on a continuously moving glass sheet and simultaneously calibrating each measured increment.

Another object is to provide an apparatus for continuously measuring predetermined increments of length on a continuously moving glass sheet, simultaneously calibrating each measured increment, summing the total of the measured increments, and automatically correcting any error in measured travel of the ribbon in accordance with the sum of said measured increments.

Another object is to provide a method and an apparatus by which identifiable points separated a known uniform distance in the direction of its travel, are sequentially applied to the sheet at the instant each upstream terminal of said distance, measured from the next preceding point, passes a fixed reference plane normal to the direction of travel of the sheet and containing the aforesaid second point, in summing such measured distances to obtain a first value of total travel of the first point from the second point at each respective instant, in continuously measuring the travel of the sheet to give an instantaneous second value of travel of said first point from said second point at each said instant, in comparing said first and second values at each said instant, and in algebraically correcting said second value, in accordance with and difference thereof from said first value, existing at each said instant.

In the manufacture of glass sheet, continuously, several terminal operations are carried out, such as the inspection for local defects, the control of optical quality, the location of cutting lines with a view to the elimination of defects, the application of marks, and the cutting itself. Similar operations in paper making and in the metal industry are equally served by this invention.

In order that such operations proceed with precision an apparatus is required which is capable of continuously revealing the position of the ribbon in the machine, and a fixed mark or point of reference is established from which measurements are made, for instance the total length of ribbon which has passed the mark. For that purpose I have chosen to use a roller which makes frictional contact with the moving ribbon and is connected to a counter. Such apparatus is theoretically capable of revealing at any instant the length of the ribbon which has passed it, but in practice it is subject to errors accidental, inherent, or occasional, which are cumulative and, after some time, amount to substantial error. In glass cutting this error may grow great enough to retain the defects in the commercial sheets.

The method of the invention involves the application to the moving ribbon or sheet of marks which are exactly spaced, the distance established by these marks being compared continuously or from time to time with the distance reported by the continuous measuring device, and any difference being used to correct the errors in the continuous measuring apparatus. The actual functions performed are numerous and include progressive correction of cumulative errors and prevention of future errors. The process to be described in detail involves the correction, from time to time, of the readings of the counter to the standard of accuracy established by the passage of exactly spaced marks past a fixed point of reference.

The following description reveals an electronic comparator which calibrates equidistant marks on the ribbon, or marks of irregular spacing which are applied by the ordinator which programs a glass sheet for cutting. It also reveals a mechanism which automatically effects the corrections. The apparatus has the advantages of being economical in construction and effective in use, of providing for the direct drive of auxiliary apparatus, and in case the continuous operation stops, of preserving the existing relationships and the corrections that have been made. The invention also involves the use of the corrected measurement in coordination with the commands issued by the mechanism which controls the several operations to which the ribbon is subjected.

In the drawings:

FIG. 3 is a chronogram of the operation of mensuration;

FIG. 6 is a diagram of the assembly, for the corrective mechanism of FIG. 5, in the system; and FIG. 7 is a variant of FIG. 6.

Figure 1:
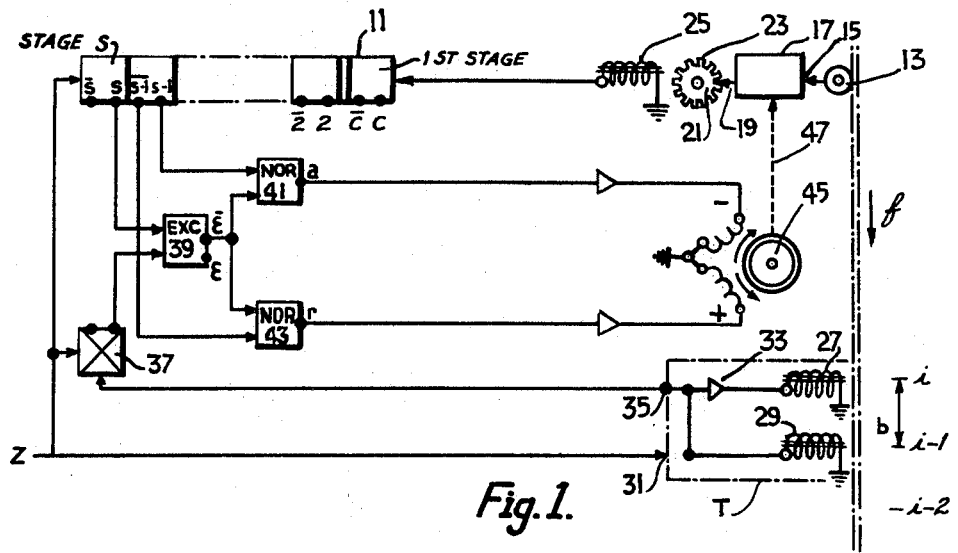
FIG. 1 is a diagram of apparatus for analogic correction with periodic self-correction.

Method and apparatus will be described together. In principle, the reading given by the indication $x$ of the counter, of the apparatus for continuous measurement, is to be compared at each passage with the reading $X$ from spaced markings $i$ yielded by a reading head. If this apparatus is perfectly coordinated one has $x=X=X_i$ but if it is not, successive errors of $\epsilon_1, \epsilon_2, \ldots \epsilon_i$ will appear.

The continuous measurement is ordinarily carried out by a roller, in contact with the glass sheet, which is connected to various apparatus, for instance to a decimal counter analagous to the odometers of automobiles, including wheels of interrupted rotation defiling before a viewing aperture to display units, tens, etc. Such a device reveals length according to its degree of inherent accuracy, for instance revealing units of a millimeter or less and progressively recording the length of glass that has passed it. The several wheels can be used to supply signals of registration or the like at selected intervals.

In practice it is advantageous to use an electronic comparator system upstream, preferably a logic system, in which each stage reveals simply the existence of successive conditions. The existence of a condition R (possibly $r$ or state 1) is marked by the appearance of a given signal, such as a reference voltage (e.g. 24 v.) at an output terminal $r$, and its non-existence (possibly $\bar{r}$ or state 0) by the disappearance of this signal and the possible appearance of a complementary signal on a different output terminal. The practical apparatus will find a binary electronic counter 11 (FIG. 1) useful. This counter is controlled by a wheel 13 of which the shaft 15 first transmits the motion to the mechanical corrector 17. The output shaft 19 of this apparatus drives a counting wheel 21, which is of notched steel having teeth 23, which turns before a magnetic pawl. The passage of the teeth before the pawl induces a sharp variation of the magnetic induction of the coil associated with the pawl, generating an electrical impulse C as diagrammatically indicated in FIG. 3. The series of impulses C is amplified and calibrated and sent to the initial stage of the counter, inducing the appearance of a periodic rectangular signal composed of two complementary signals $c$ and $\bar{c}$. All stages of counter 11 being at state 0, the first signal C at the corresponding input terminal initiates the passage of the first stage from its initial state $0(\bar{c})$ to state $1(c)$. The arrival of the following signal initiates the return to state 0, which controls the oscillation of the second stage from $\bar{2}$ to 2 (FIG. 3). The chronogram of the states of the different stages is at the top of FIG. 3. If the counter is comprised of $n$ stages, it is capable of counting up to $2^n-1$ before returning to 0. On the other hand, the final stage $s$ oscillates every time all of the lower stages return from state 1 to state 0 after a complete revolution, that is to say, every $2^s$ impulses. Every stage, such as $s$, is provided with two output terminals $s$ and $\bar{s}$ and thus play, for successive powers of 2, a part similar to every wheel of the decimal counter described above, but the number inscribed by steps is the binary expression of the number of teeth passing before the pawl since the start, that is, of the sum $x$, revealed by the counter, of the length X of the ribbon which has actually passed.

In the operation of stepwise measurement a pair of fixed points or reference may be used, the spacing of which is exactly known, for example the distance between two magnetic heads, one of which marks the moving ribbon and the other of which responds when the mark passes before it. For this purpose one may apply to the ribbon a magnetic strip, for instance a film of magnetic ink or a strip of magnetic paper. The marking mechanism T is known and includes a marking head 27 and a reading head 29 spaced exactly at a distance $b$. The reception of an impulse Z from an external source at the terminal 31 inscribes the strip, by head 27, with an initial index 0. When that mark passes before the reading head 29 it initiates an impulse E which is returned to the head 27 to initiate another mark 1. Every emission of an impulse at the terminal 35 thus corresponds to the passage of an exactly measured length of ribbon $b$. It is advantageous to give this signal rectangular form including complementary signals $e$ and $\bar{e}$ (FIG. 2) by sending them to a bistable balance 37. The first signal Z will return simultaneously to state 0, the continuous counter 11, and the balance 37. The length X which has passed at the moment when the index mark 0 reaches the head 29 is thus equal to $b$; it is also equal to distance $X_1$ between mark 0 and mark 1. In general therefore $X=X_i=i\times b$.

In other words there is successive recognition by the apparatus, end to end thereof, of exact lengths $b$, providing whatever degree of exactitude is necessary to the subject. The error may be rendered negligible by choosing $b$ to be of substantial length, e.g. 10 m.

The error can be derived automatically by a variety of different electric or electronic comparator circuits. In general, it is arranged that length $b$, established by the marking and reading heads, corresponds to a return of the counter to state 0, that is to a complete revolution of the $s-1$ last stages, and to the balancing of stage $s$. If no error $\epsilon$ exists, the passage of a mark $i$ on the ribbon under the reading head and the return to 0 are coincidental. In the contrary case, if they are not coincident, two possibilities may be availed of: (1) to initiate the reading of the counter at the passage of mark $i$, that is to say to establish the error in magnitude and sign, or (2) to close a circuit for measuring $\epsilon$ by means of the first of the two signals E emitted by the passage of the mark under the reading head, or S corresponding to the return to 0, to let a signal of error pass, which may be continuous, or a series of elemental signals at regular intervals which can be supplied by an exterior apparatus or, preferably, by the counter itself. The circuit is broken when the second of the signals S and E passes. The signal of error will be sent directly to the corrective apparatus, or will be stored in a computer of errors for future use. The length of the signal of error is used to represent the magnitude of the error. The order in which the mark passes the reading head and the counter returns to 0 establishing the sign of the error by acting on one of its characteristics, for example the polarity of the signal.

An example of a useful arrangement is shown in FIG. 1 in combination with the chronogram of FIG. 3. The circuit is composed of transistorized logic modules existing in commerce, for instance those made by Societe SGN, and which need no detailed illustration.

The detection of error uses a module EXCLUSIVE OR (EXC). Such a module is analogous to an association of two relays mounted in go and come; it emits a signal at one or the other of the output terminals according to whether the state of the two input terminals is the same or different. Under the conditions defined above the signals $e$ and $s$ are theoretically synchronized. The existence of an error corresponds to an offset of the signal $s$ and may therefore be characterized by one or the other of the two signals $\epsilon$ and $\bar{\epsilon}$ received on output terminals of module 39 of type EXC, branch-connected between $e$ and $s$.

The determination of the sign of the error and its direction utilizes two modules NOR. This type of module, which is comparable to a combination of two closed contact relays mounted in series, does not give an output signal except when there is no signal on the input terminals.

It will be observed on the chronogram of FIG. 3 that, if the counter advances, the disappearance of the signal $\bar{\epsilon}$ coincides with the absence of a signal $s-1$ so that the signal $a$ initiated by the simultaneous disappearance of signals $\bar{\epsilon}$ and $s-1$ at the input of module 41, of type NOR, characterizes this advance. At the same time if the counter slows, a signal $r$ will appear at the output of module NOR 43 branch-connected between $\bar{\epsilon}$ and $\overline{s-1}$. The signals $a$ and $r$ respectively permit the determination of the error in magnitude and sign. To introduce this in the mechanical correction mechanism 17 it is possible to send them directly to an analogic step by step motor 45 having a double winding as indicated in FIG. 1.

The activation of the negative terminal is accomplished by continuous signal $a$ (amplified) and this rotates the output shaft 47 at low and constant speed in a given direction designed to correct the advance. The activation of the plus terminal initiates a movement at the same speed but in the opposite direction. The amplitude of the correction will therefore be proportional to the duration of the signal and its direction will be established by the orientation of the command signal.

Figure 2:
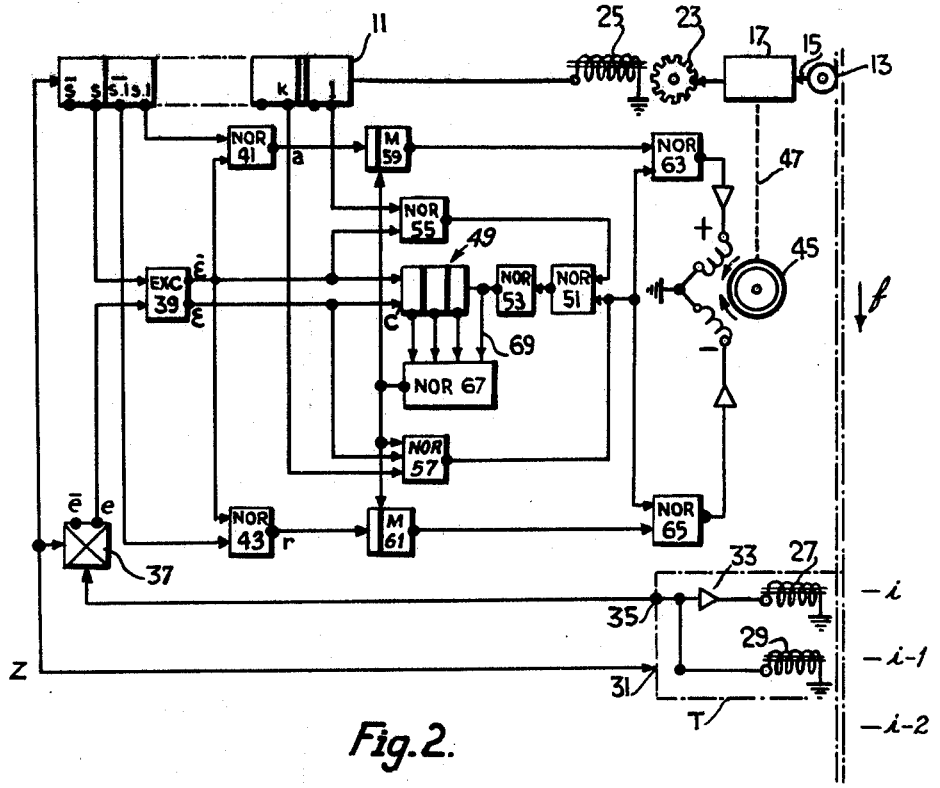
FIG. 2 is a diagram of apparatus for numerical correction with periodic self-correction.

It is useful in the manufacture of flat glass, where a good quality of cutting is desirable, to be able to make a very fine correction and it is then preferable to use a numerical step by step motor in conformity with the scheme of FIG. 2. Such motors generally posses two ratchet gears and its angle of rotation in each direction is proportional not to the length of any continuous command signal but, on the contrary, to the number of impulses in a signal composed of a plurality of impulses. The signals $a$ and $r$ are then used, on the contrary, to form signals such as A and R (FIG. 3) to direct the passage of impulses such as $c$ (furnished for example by the first stage of the counter) toward one or the other winding of the motor, in a number proportional to the relative displacement of the signals S and E. At the same time the reaction time of the mechanism is incompatible with the frequency of the fine impulses, which generally prevents instant operation and requires the storing of the impulses constituting the signal A or R in order that they may be used later at a $k$ times lower frequency.

One may then use the scheme set forth in FIG. 2 wherein a counter-decounter 49 is associated with the motor. An input circuit composed of two modules NOR 51 and 53 arranged in series allows the sending to the computer of either the rapid impulses $c$ through the module NOR 55 or the slow impulses $k$ through the module NOR 57. Throughout the duration of the possible error the counter-decounter 49 is blocked in counting position by signal $\epsilon$ at terminal $c'$ while the absence of signals $\bar{\epsilon}$ at module NOR 55 allows rapid impulses $c$ to pass. Simultaneously the orientation signal reaches one of the two memories 59 and 61: For example, the signal $a$ put out at the terminal of NOR 41 is retained by memory 59 and blocks, in anticipation of decounting, module NOR 63 which controls the plus winding.

The inversion of signals $\epsilon$ and $\bar{\epsilon}$ thereafter terminates the counting which sets up decounting through module NOR 57 by the low frequency signals $k$ which will reach the motor through unblocked module NOR 65. However, the authorization of decounting is subjected to a second condition: The module NOR 67, connected in parallel to the different stages of counter-decounter 49, blocks the module NOR 57 and stops the decounting when the latter has returned the counter to 0, that is to say when the whole correction has been transferred through the motor 45; simultaneously, it erases memory 59, preparing the circuit for a future correction. Similarly, module 67 blocks module 57 and arrests the decounting when the error is not detectable, that is to say if it is less than a single impulse. The connection 69 is a classical security connection which prevents the connection of the blocking circuit to the counter-decounter from demultiplying the decounting signals $k$.

Instead of establishing a fixed standard of measurement on the machine one may apply to the ribbon a succession of lengths which are not necessarily equal. For example with the aid of a machine or marker progressing intermittently along the ribbon to trace upon it marks at measured distances equal or unequal. Such an apparatus is described in French Patent 1,237,305 and its addition 861,701. A carriage carries a tracing tool over the ribbon and its motion with respect to the ribbon is reported by a measuring arm with precision. During the tracing operation the carriage is attached to or travels with the ribbon. The action of such an apparatus is revealed in FIG. 4. The total of the cutting and finishing operations is controlled by an ordinator N. As the length of the ribbon of glass 71 moves continuously in the direction of the arrow $f$ through a succession of machines, such as a machine D for the detection of quality, a machine T' for tracing, a machine E' for the application of marks, a machine R' for cutting, the carriage 73 of the tracing machine T' moves along a rail 75 mounted on the base of the machine between two extreme positions 75a and 75b. The carriage 73 has a locking system 77 which can fix it in position to move with the sheet. It carries an arm 79 which can move across the machine between two abutments 79a and 79b, this arm being equally capable of moving with the ribbon by means of a locking system 81. The carriage carries a rail perpendicular to the plane of the figure and the tracing tool 83 can be moved along the rail.

At the start the arm 79 is against 79a; in a first period of time the carriage is fixed with respect to the ribbon by 77 and the tool 83 draws a breaking line while the carriage moves the arm 79 in the direction opposite to the motion of the ribbon until it touches 79b. In a second period of time the extremity of the arm is attached in its turn to the ribbon 71 through lock 81 and the attachment 77 is released; the carriage rejoins the arm in abutment on 79a and is again locked to the ribbon; the operation is thus repetitious. The carriage has thus advanced a distance which is determined by the space between the abutments 79a and 79b. The detecting machine D detects the defects as the ribbon passes beneath it and records their position by transferring the corresponding indication $x$ of the counter 11 into the memory $M_D$ through the gate AND 85. As a result of the general instructions which constitute its program, the central means G of the ordinator devises a cutting plan; that is to say, a sequence of advances $b_1, b_2, \ldots b_i, b_i+1$ of the tracing machine, by inserting the list 0 of dimensions which are to be made in the sequence of the values $x_D$ accumulated in the memory $M_D$. This cutting plan limits the loss of glass to a minimum by executing the cuttings as closely as possible to the defects and it also controls the total of the finishing operations. The position of the abutment 79b on the arm is controllable and the ordinator changes it between every advance of the carriage as a function of the established cutting plan, the amount of the advance being drawn from the memory $M_B$. There are thus applied to the ribbon cumulative, successive lengths of glass which are expressed $X_i = b_1 + b_2 \ldots + b_i$, but this time the base is movable along the machine and it is necessary to know its position when it acts, that is to say to know its position at an arbitrary instant chosen while it is locked upon the ribbon. This being then $t_i$, its algebraic distance to its chosen point of origin $A'$, it is possible to calculate $X = X_i + t_i$. To determine the instantaneous value of $t_i$, the installation contains an apparatus which instantaneously reveals the position of the machine making the traces with respect to the frame or, more exactly, with respect to a graduated rail 87 schematized in FIG. 4. For details of such structure French Patent 1,340,293 may be consulted.

This apparatus comprises a reading rule of binary type composed of a certain number of magnetic plots. The passage of a mark 89 of the carriage by one of these plots modifies the current which flows through it and enables the position of the cariage to be numerically determined. When the carriage is locked on the sheet to effect the tracing of the cutting line $i$, it provokes the reading of the order $i+1$ in the memory $M_B$. It also imposes upon the memory 91 an order of transfer through gate 93; the passage of the point 89 of the carriage by the following plot 95 authorizes the transfer of the value $x$, read by the continuous counter, to the memory $M_x$ through the gate 97 and releases the registration of the abscissa $t_i$ in the memory $M_T$, wholly effacing the authorization. The calculator then determines the value of $X = X_i + t_i$ which it inscribes in the memory $M_x$, then that of $\epsilon_i = x - X$. The principle of correction is not changed, but its method of application need not be identical with the foregoing for elementary details; in effect the return to 0 of the counter is not usually effected in coincidence with the passage of the mark inasmuch as the distance between the marks is, in this case, variable and the difference $x - X$ must be effectively calculated. It is to be noted that it is not necessary that this calculation be made instantaneously.

Figure 4:
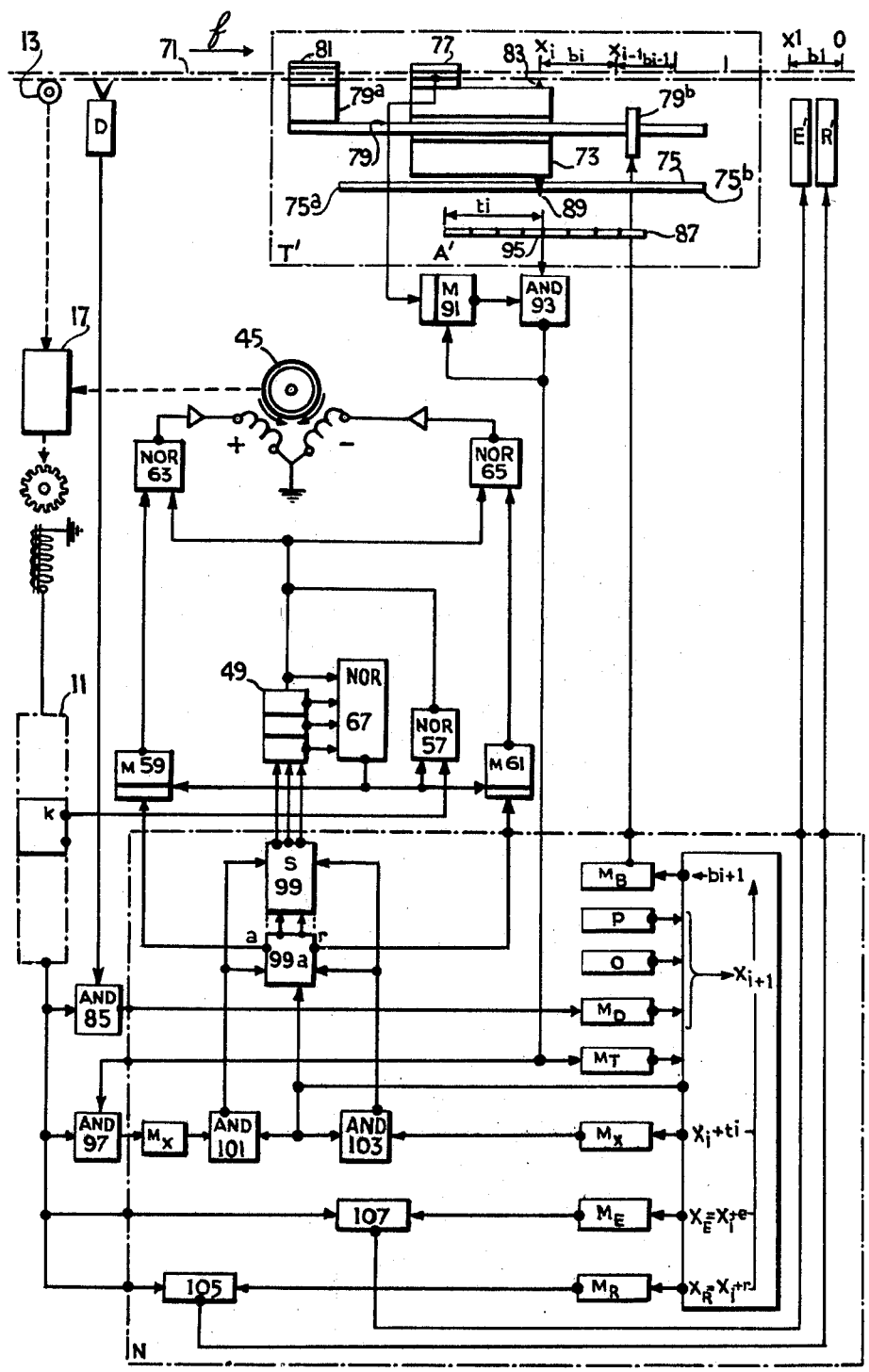
FIG. 4 is a diagram of corrective apparatus of numerical type with a periodic measurement combined with an ordinator.
Figure 5:
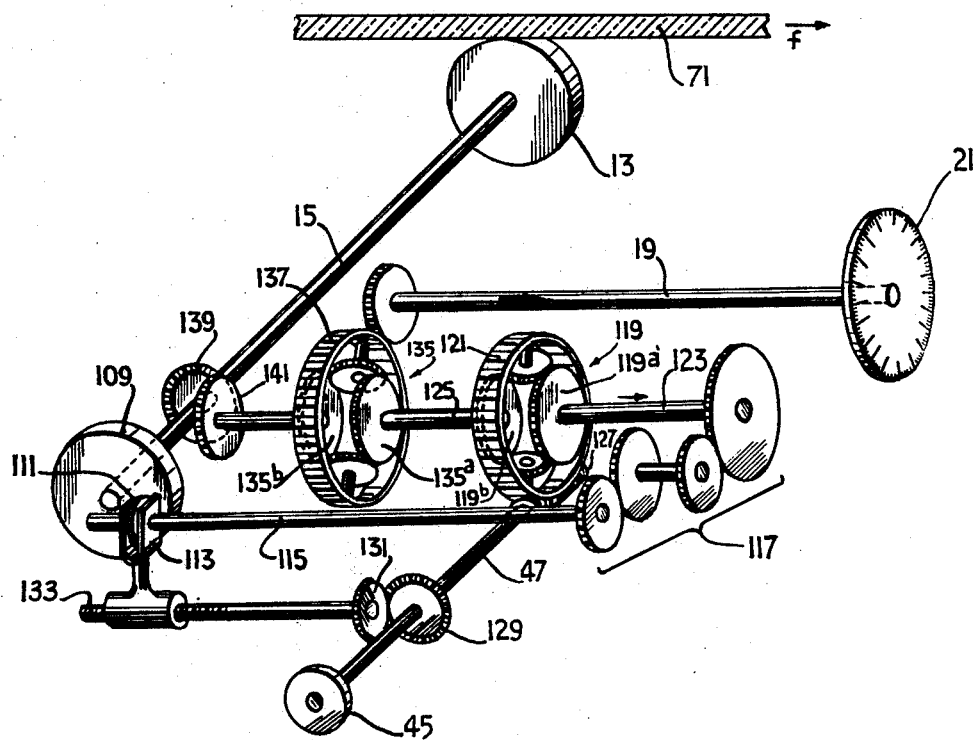
FIG. 5 is a perspective, diagrammatic view of corrective mechanism with integrates the continuous and discontinuous mensurations with a correction of the former by the latter.

It is useful to explain the determination of $\epsilon_i$ and it has been diagrammed in FIG. 4 inasmuch as it would be carried out like that of X, by one of the calculating means of the ordinator. This apparatus is an adder-subtractor 99. When the sequences of operations hereinbefore recited have been carried out, the program locks 99 in a position of subtraction and it authorizes the transferring of $x$ and $X$ through the gates 101 and 103 respectively. The result of the subtraction is transferred to the decounter 49 which controls the motor 45 through a circuit similar to that of FIG. 2, it being noted that the absence of the counting circuit permits the elimination of modules NOR 51 and 53. The subtractor includes an element which acts to give the sign of $x - X$ or preferably, to compare $x$ and $X$. It is this comparator 99a which is used to block one or the other of the memories 59 and 61 of the circuit of command. FIG. 4 also shows the use of the corrected value $x$ on the different machines. They can be put in operation at successive instants such as $X_E = X_i + e$; $X_R = X_i + r$, $e$ and $r$ taking into account the co-ordination of the machines along the ribbon, $e$ being particularly directed to integrating the necessary displacement of the marker with respect to the inscribed line.

The ordinator puts these values respectively in the output memories $M_E$, $M_R$ .... In the case of the cutting machine $R'$, the earliest, that is to say the smallest, of the values stored in memory $M_R$ is transferred to the comparator 105 which is a binary differential counter, an integral part of the ordinator, where it is permanently subtracted from the value $x$ transmitted by the counter 11. The corresponding command for operation is sent to the machine $R'$ as soon as the difference is annulled. In the previous case in which the measurements are effected by fixed heads, the tracing machine will be similarly controlled.

Having thus determined by one or the other of the processes just described the algebraic value of the error $\epsilon$, an apparatus is provided, an invention in itself, which uses that error to correct the reading on the counter of continuous measurement of the ribbon, and to modify its speed regulation to anticipate and prevent future errors.

The errors of the continuous counter may be attributed to two major causes: accidental errors of position and systematic errors or errors of speed derived from deformations in the apparatus or object, wear of parts. The relative importance of these two errors in the total error is variable and cannot be anticipated. In particular, the apparatus is designed to progressively eliminate the systematic error, so far as possible. A complete correction of this error at each stepwise measurement is not wholly possible and the apparatus can be treated as of servo type. Experience has shown that in the operations of cutting a ribbon of glass, to derive a stable system capable of self-regulation from time to time, it is helpful to correct the position of the established error in a proportion on the order of 75%, and to apply to the correction of the differential speed a mean proportion of 33% of the same error.

The apparatus according to the invention therefore involves a two-part correction: In the first part of which the number read on the counter 11 is corrected at a given instant so as to reduce the magnitude of the accumulated error by a high percent, namely $\lambda'$; and in the second part of which the speed of the counter is modified by changing the ratio of transmission between the roller and the counter proportionally to $\lambda_c$ so as to prevent future systematic errors. In other words the first part of the correction corrects the error accumulated in the counter while the other part of the correction is used to modify the speed of the counter in relation to the roller. These two corrections are made by the following apparatus: The shaft 15 drives a speed-change gear, for instance an integrator of which the disk 109 drives roller 111 carried by bearings 113 at a variable distance from the center of the disk. The driven shaft 115 is rotated faster or slower according to the position of the wheel 111 on the disk 109 and in its turn drives a gear train 117 connected to the sun 119a of a planetary differential 119. The driven shaft 125 is driven from shaft 123 through the planetary gears and sun 119b. The ring 121 is provided with teeth and the source of power 45 drives it by endless screw 127 which allows the differential to be moved through a certain angle independently of the output speed and this offset is transmitted to the disk 21 of the counter. Simultaneously, conical gears 131, 129 of endless screw 133 control the bearing 113, the motor 45 displacing the friction roller 111 and changing the speed of rotation of the shaft 115 and the train attached to it.

There is therefore transferred to the output shaft two corrections which are proportional to the detected error, one of speed and the other of position, of which the respective importance is determined by the reductions of the different gears. The reductions are adapted to the mean speed of the ribbon so as to relate the sensitivity of the correction to the absence of wear in the drive. This is facilitated by the addition of a fixed differential 135 of which the ring 137 drives the shaft 19 and thus combines the slow corrective movement received from shaft 125 and sun 135a with the principal movement received from sun 135b from the conical gears 139, 141.

In FIG. 6 the differential 135 is upstream of differential 119 but their positions can be reversed so as to impose the correction of position upon the total movement in conformity with the diagram of FIG. 7.

The total correction is thus divided between correction of position and correction of speed and it is to be noted that the correction of position may be imposed upon the counter itself by the interposition of dividing stages which establish the correction of 75% error.

The apparatus measures and totalizes the flow of a ribbon of any chosen material by contact of the material with a calibrated roller and with appropriate counting mechanisms; and it corrects errors arising from defective frictional contact, from change in size or quality of the detecting and recording mechanism, by applying marks to the ribbon at precisely measured intervals, the detector-totalizer being corrected to approximate the precision established by the marks.

As many apparently widely different embodiments of the present invention may be made without departing from the spirit and scope thereof, it is to be understood that the invention is not limited to the specific embodiments.

What is claimed is:

1. An apparatus for measuring the length of a strip of glass comprising means for moving said strip in a predetermined path, first means for continuously measuring the distance of a point on said strip relative to a fixed point adjacent said strip path, second means in said strip path for continuously measuring and marking on said strip equal calibrated increments of strip length from said point on said strip, means responsive to said second means for continuously totaling said measured calibrated increments, third means connected and operated by said first and second means for simultaneously comparing the totaled calibrated increments as determined by said second means with the length measured by said first means and determining any error therebetween, means operated by said third means to correct the measured value of said first means, by and in accordance with said error, a computer, and means responsive to the corrected measurement of said first means and operable to set the corrected measurement continuously into said computer.

2. An apparatus for measuring the length of a strip of glass comprising means for moving said strip in a predetermined path, first means including a roller frictionally engaging and rotated by travel of said strip, for continuously measuring the length of said strip passing a fixed point in said strip path, second means for continuously measuring calibrated increments of strip length from said point on said strip, marking means actuated by the initiation of the measurement of each calibrated increment to cause a mark to be made on said strip whereby a succession of marks separated by a known calibrated distance are formed on said strip in alignment along said path, means responsive to the operation of said second means for totaling said measured calibrated increments, third means connected to said first and second means and conjointly operated thereby, for simultaneously comparing the total measured calibrated increments with the length of strip measured by said first means and calculating any error therebetween, means operated by said first means for correcting the distance measurement of said first means by the amount of said calculated error, computer means, and means introducing the corrected distance measurement of said first means, into said computer means.

3. An apparatus for measuring the length of a strip of glass moving in the direction of its length, comprising, first means for continuously measuring the distance traveled by a point fixed with said strip, with respect to a fixed point in said strip path, second means for repeatedly measuring calibrated increments of length of said strip passing said fixed point, third means responsive to the operation of said second means for totaling said measured calibrated increments, means conjointly operated by said first and third means for simultaneously comparing the total measured calibrated increments with the length of strip measured by said first means and calculating the error therebetween, and means operated by said last-named means for correcting said first means by the amount of said calculated error.

4. The apparatus of claim 3, said last-named means including a variable speed drive connected to operate said first means, and means varying the speed output of said drive directly in proportion to said error.

5. In an apparatus for measuring the distance of travel of a ribbon of material moving in the direction of its length, a first roller frictionally engaging the ribbon, to be rotated by and in proportion to travel thereof in said direction, first and second differential means, a variable speed drive, a first driving connection between said first roller, the first side of said first differential means and the input of said variable speed drive, a second driving connection between the output of said variable speed drive and the first side of said second differential means, a third driving connection between the rate adjusting element of said variable speed drive and the second side of said second differential means, a fourth driving connection between the third sides of said first and second differential means, indicator means, and a fifth driving connection between the second side of said first differential means and said indicator means.

6. The apparatus of claim 5, said first and second differential means being mechanical, said first and third sides of each said differential means being sun gears, and said second sides thereof being ring gears each having a planetary gear in mesh with its sun gears.

7. The apparatus of claim 6, the input and output of said variable speed drive being, respectively, a disk having a plane face and a second roller frictionally contacting said plane face and adjustable as a unit with said rate adjusting element, radially of and with respect to said plane face, said rate adjusting element being operable to so adjust said second roller.

8. The apparatus of claim 5, an inscription head fixedly mounted adjacent said first roller and the ribbon and operable to inscribe a detectable spot in said ribbon, a reading head fixed a predetermined distance in said direction, downstream of said inscription head, and operable to create a signal by and in response to passing thereadjacent, of a detectable spot in said ribbon as inscribed by said inscription head, and means operated by said signal to adjust the rate adjusting element of said variable speed drive, by and in proportion to the difference between said predetermined distance and the corresponding instantaneous indication of said indicator means.

9. The apparatus of claim 8, said first roller being located between said heads.

10. The apparatus of claim 8, said inscription head operating to create a detectable magnetic spot in said ribbon, said reading head creating an electric signal by and in response to passage of said magnetic spot thereadjacent.

11. The apparatus of claim 10, and an electrical circuit between said heads, effective to trigger said inscription head to create a magnetized spot in said ribbon, by and in response to passage of the next previous magnetic spot adjacent said reading head.

12. The method of continuously determining the distance of a first point on a strip of material moving in the direction of its length, from a second fixed point, comprising, sequentially setting off on the strip, a series of measuring points each spaced in said direction and in sequence from said first point by consecutive integer multiples of a known predetermined distance interval, sequentially summing said distance intervals as each measuring point passes said second point, to periodically obtain a first distance value, continuously measuring by a rolling contact device, the distance of said first point from said second point, to obtain a second distance value, comparing said first and second values to detect any difference therebetween, and correcting the distance value measured by said rolling contact device, in accordance with such difference.

13. The method of claim 12, said correcting being effected by algebraically adding to the distance value determined by said rolling contact device, the sum of first and second correction components, said first component being directly proportional to said difference, said second component being the time integral of said difference.

14. Apparatus adapted to the mensuration of moving lengths of material comprising first means to measure and totalize the length of material moving past a point of reference, such means including means responsive to fourth means to correct errors of the measuring means; second means arranged along the length of material to mark on the material distances measured from the point of reference; third means operatively connected to the first and second means to compare the total length measured by the first means with the length established by the marks applied by the second means, the third means including means revealing error in the mensuration by said first means in number and in sign; and fourth means connected to and controlled by the third means, and connected to and controlling the correcting means of the first means.

15. Apparatus according to claim 14 in which the first means comprises an electronic numerical counter.

16. Apparatus according to claim 14 in which the second means marks equal distances on the length of material.

17. Apparatus according to claim 14 in which the second means includes a fixed marking head, a fixed reader, and means connecting the head to the reader for operation thereby.

18. Apparatus according to claim 14 in which the second means includes a marking traveler provided with a measuring arm which reports increments of length and marks them in sequence on the material.

19. Apparatus according to claim 14 in which the second means are connected to a calculator which determines the total value of the increments of distance marked on the length of material.

20. Apparatus according to claim 14 in which the third means includes an electronic system which measures the spacing of the signals emitted by the first and second means and transmits command signals to the fourth means.

21. Apparatus according to claim 19 in which the third means are connected to a calculator which determines the difference between the numerical values of the lengths supplied by the first and second means.

22. Apparatus according to claim 14 in which the fourth means includes a step by step motor in control of a correcting gear connected to the first means.

23. Apparatus according to claim 22 in which the step by step counter comprises a numerical command motor, and the fourth means comprises a counter which records the error and applies it to the step by step motor.

24. Apparatus according to claim 23 in which the correcting gear includes a speed changing mechanism in series with a differential the position of which is controlled by the motor.

25. Apparatus according to claim 24 in which the speed correcting gear comprises a differential which combines in its output arm the uncorrected movement received directly from the first measuring means and the correction supplied by the speed changing gear.

26. A method of measuring and recording the length of a ribbon of material which passes a station which comprises continuously detecting and totalizing the flow of the material past the station, applying a sequence of marks to the material at precisely measured distances, and correcting errors in the continuous detection and totalization by imposing thereupon approximate conformity to the values provided by the spaced marks.

27. A method according to claim 26 which comprises imposing a double correction upon the continuous system of measurement, the first of which corrects accidental errors of position and the second of which corrects systematic errors and errors of speed.

References Cited

UNITED STATES PATENTS

| | | |
|---|---|---|
| 2,603,688 | 7/1952 | Cole et al. |
| 2,989,690 | 6/1961 | Cook. |
| 3,050,857 | 8/1962 | Pierce et al. |
| 3,058,223 | 10/1962 | Schmidt et al. _____ 33—129 |

HARRY N. HAROIAN, Primary Examiner